US011608870B2

(12) United States Patent
Urmosi et al.

(10) Patent No.: US 11,608,870 B2
(45) Date of Patent: Mar. 21, 2023

(54) SHOCK AND VIBRATION ISOLATING HANDLEBAR MOUNTING SYSTEM

(71) Applicants:Robert Urmosi, Mount Dora, FL (US); Wallace Spaulding, Orlando, FL (US)

(72) Inventors: Robert Urmosi, Mount Dora, FL (US); Wallace Spaulding, Orlando, FL (US)

(73) Assignee: Urmosi & Spaulding, LLC, Mount Dora, FL (US)

( * ) Notice: Subject to any disclaimer, the term of this patent is extended or adjusted under 35 U.S.C. 154(b) by 0 days.

(21) Appl. No.: 17/365,318

(22) Filed: Jul. 1, 2021

(65) Prior Publication Data

US 2022/0268334 A1 Aug. 25, 2022

Related U.S. Application Data

(60) Provisional application No. 63/153,280, filed on Feb. 24, 2021.

(51) Int. Cl.
*F16F 7/12* (2006.01)
*B62K 21/12* (2006.01)

(52) U.S. Cl.
CPC .............. *F16F 7/121* (2013.01); *B62K 21/12* (2013.01)

(58) Field of Classification Search
CPC ................................. F16F 7/121; B62K 21/12
USPC ............................................ 74/551.1, 551.8
See application file for complete search history.

(56) References Cited

U.S. PATENT DOCUMENTS

| 2003/0084746 | A1 | 5/2003 | Cutsforth | |
|---|---|---|---|---|
| 2006/0163831 | A1* | 7/2006 | Henrickson | B62K 21/18 280/93.51 |
| 2008/0203699 | A1* | 8/2008 | Truchinski | B62K 21/14 280/276 |
| 2011/0239814 | A1* | 10/2011 | Athanasiou | B62K 11/14 74/551.2 |
| 2012/0304804 | A1* | 12/2012 | Ferguson | B62K 21/14 74/551.2 |
| 2017/0233030 | A1* | 8/2017 | Smith | B62K 21/14 74/551.2 |

FOREIGN PATENT DOCUMENTS

EP 2979965 A1 * 2/2016 ............ B62K 21/08

* cited by examiner

*Primary Examiner* — Vinh Luong
(74) *Attorney, Agent, or Firm* — Jason T. Daniel, Esq.; Daniel Law Offices, P.A.

(57) ABSTRACT

A vehicle handlebar mounting device and system includes a handlebar clamping assembly, a steering clamping assembly and an isolator. The handlebar clamping assembly having an upper clamp component and a lower clamp component each having protrusions that extend outward from one surface and that are joined together to form a single circular opening for receiving a handlebar. An isolator that is constructed from an impact absorbing material includes a circular-shaped main body having a hollow central channel, a plurality of protrusions extending outward from one end and a plurality of apertures extending through the protrusions. Each of the apertures receiving the plurality of protrusions of the handlebar clamping assembly. The vehicle steering clamping assembly includes a riser and a clamp structure that form a circular opening for receiving the isolator and handlebar assembly.

9 Claims, 8 Drawing Sheets

US 11,608,870 B2

SHOCK AND VIBRATION ISOLATING HANDLEBAR MOUNTING SYSTEM

CROSS-REFERENCE TO RELATED APPLICATIONS

This application claims the benefit of U.S. Application Ser. No. 63/153,280 filed on Feb. 24, 2021, the contents of which are incorporated herein by reference.

TECHNICAL FIELD

The present invention relates generally to motorcycle and ATV components, and more particularly to a shock and vibration isolating a handlebar clamp assembly.

BACKGROUND

The statements in this section merely provide background information related to the present disclosure and may not constitute prior art.

Street legal motorcycles and all-terrain vehicles (ATV) such as 3-wheelers, 4-wheelers, snowmobiles, and dirt bikes, for example, have a handlebar and steering assembly for allowing a rider to control the direction and operation of the vehicle. Traditionally, the handlebar is physically coupled to the triple clamp of the vehicle located along the top end of the front wheel forks.

Due to this mounting configuration, shocks and vibrations encountered by the front wheel and/or the vehicle frame when riding is transferred through the metallic structures and are felt by the user gripping the handlebars. In some instances, such as when riding on uneven, unpaved off-road conditions, these vibrations and shocks can be severe. To this end, it is not uncommon for riders to complain that their hands become numb or injured while riding. In some situations, this has led to accidents.

The present invention, directed to a shock and vibration isolating handlebar mounting system differs from the conventional art in a number of aspects. The manner by which will become more apparent in the description which follows, particularly when read in conjunction with the accompanying drawings.

SUMMARY OF THE INVENTION

The present invention is directed to a vehicle handlebar mounting device and system. One embodiment of the present invention can include a handlebar clamping assembly, a vehicle steering clamping assembly and an isolator component. The handlebar clamping assembly can function to engage a handlebar of a vehicle and can include an upper clamp component having a semi-circular groove along a bottom end, and a lower clamp component having a semi-circular groove along the top end.

In one embodiment, a plurality of protrusions can extend outward from one side of the upper and lower components, and each of the upper and lower components can be removably secured together to form a single circular opening through which the handlebar can be positioned.

In one embodiment, the isolator can be constructed from an impact absorbing material and can include a circular-shaped main body having a hollow central channel, a plurality of protrusions extending outward from one end and a plurality of apertures extending through the protrusions. Each of the apertures being configured to receive the plurality of protrusions on the handlebar clamping assembly.

In one embodiment, the vehicle steering clamping assembly can include a riser having a semi-circular groove along a top end, and a clamp structure having a semi-circular groove along the bottom end. The riser and clamping components being removably secured together to form a single circular opening for receiving the isolator and handlebar assembly.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
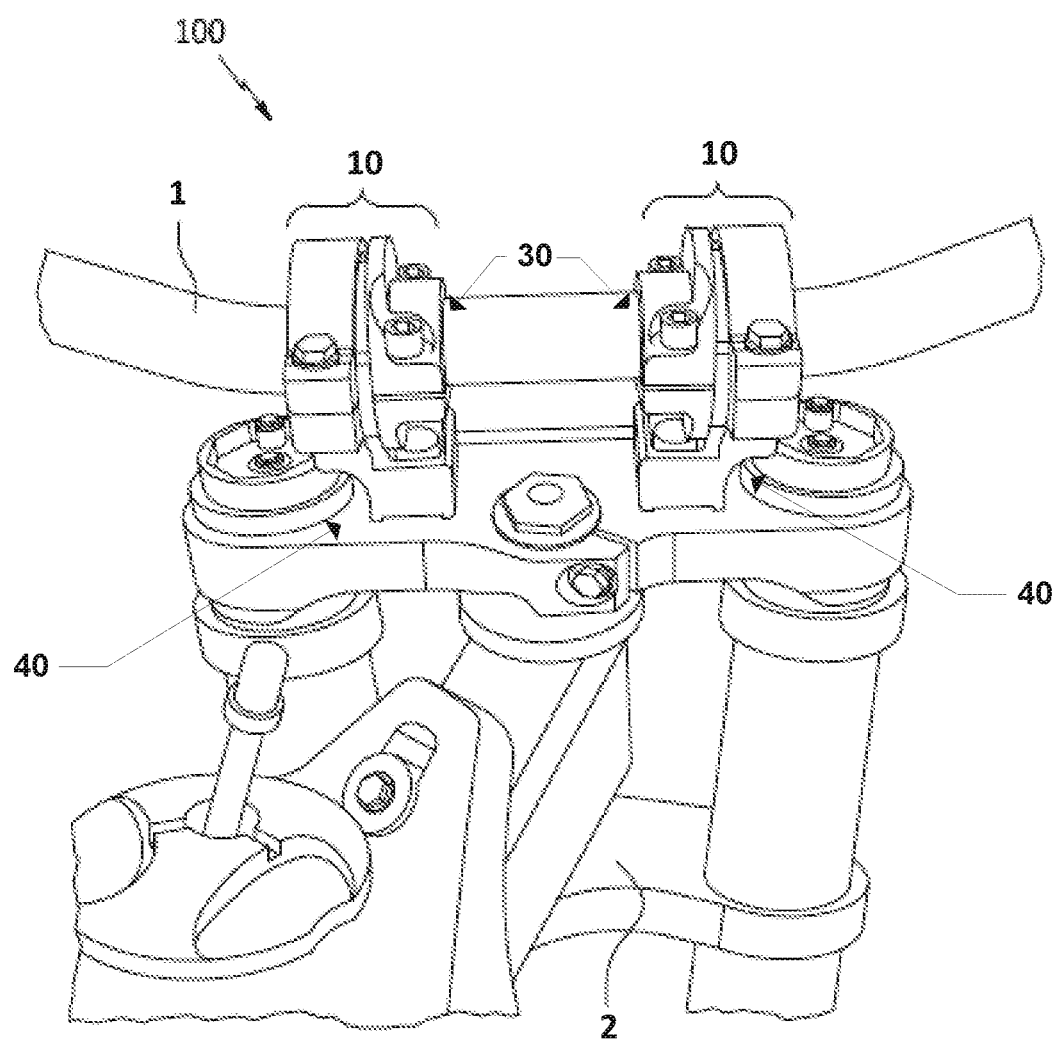
FIG. 1 is a perspective view of a shock and vibration isolating handlebar mounting system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" or "assembly" means a series of identified physical components which are linked together and/or function together to perform the specified function.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

The following drawings and description illustrate one embodiment of a shock and vibration isolating handlebar mounting system 100 and mounting devices 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 shows one exemplary embodiment of a shock and vibration isolating handlebar mounting system 100 having a pair of mounting devices 10 for mounting a handlebar 1 to a steering structure 2 of a vehicle such as a motorcycle or ATV, for example.

Figure 2:
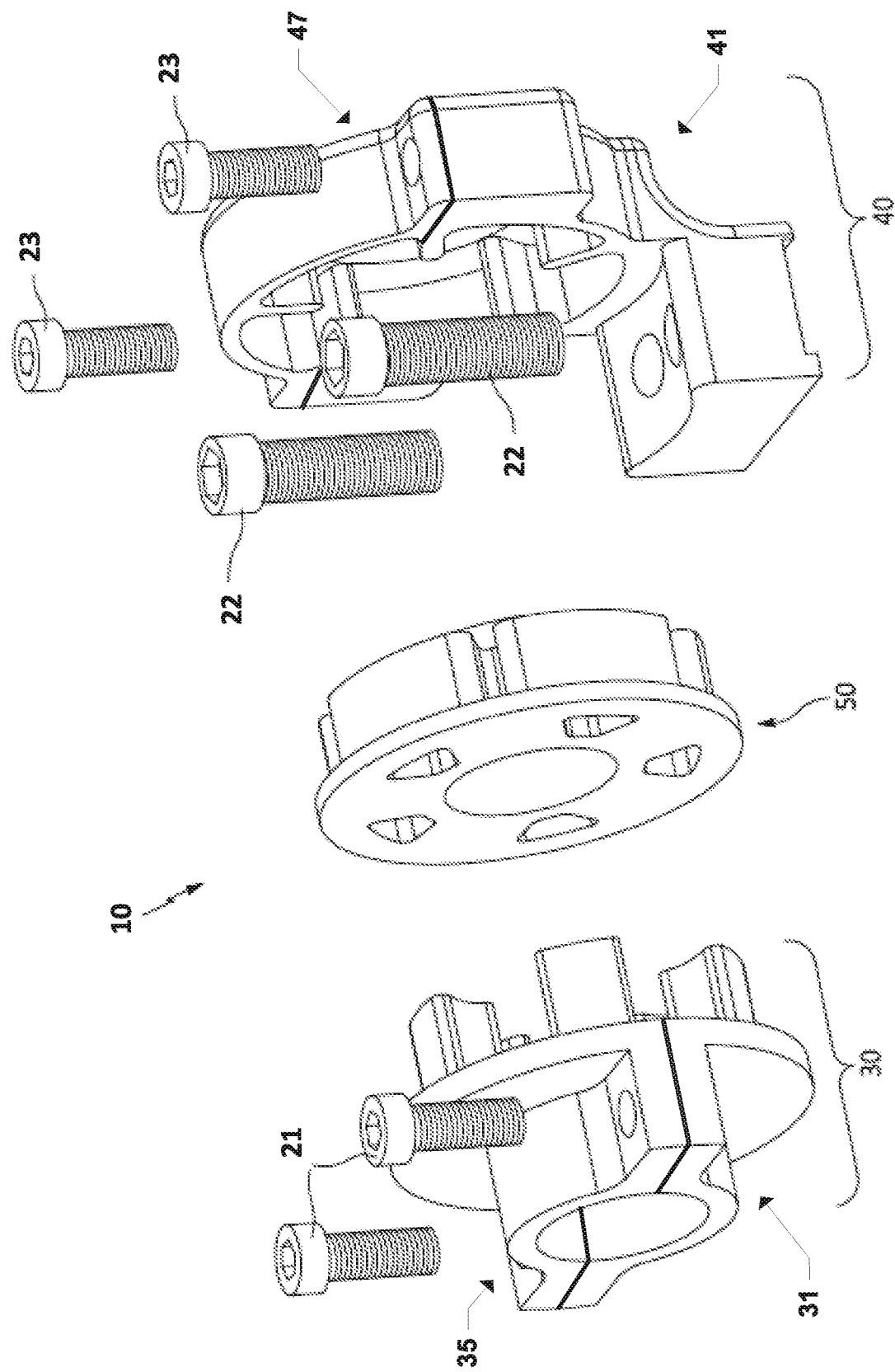
FIG. 2 is an exploded parts view of a shock and vibration isolating handlebar mounting device in accordance with one embodiment of the invention.

As shown best in the exemplary exploded parts view of FIG. 2, each of the mounting devices 10 can include a handlebar clamping assembly 30, a steering structure clamping assembly 40 and a vibration isolator 50.

Figure 3A:
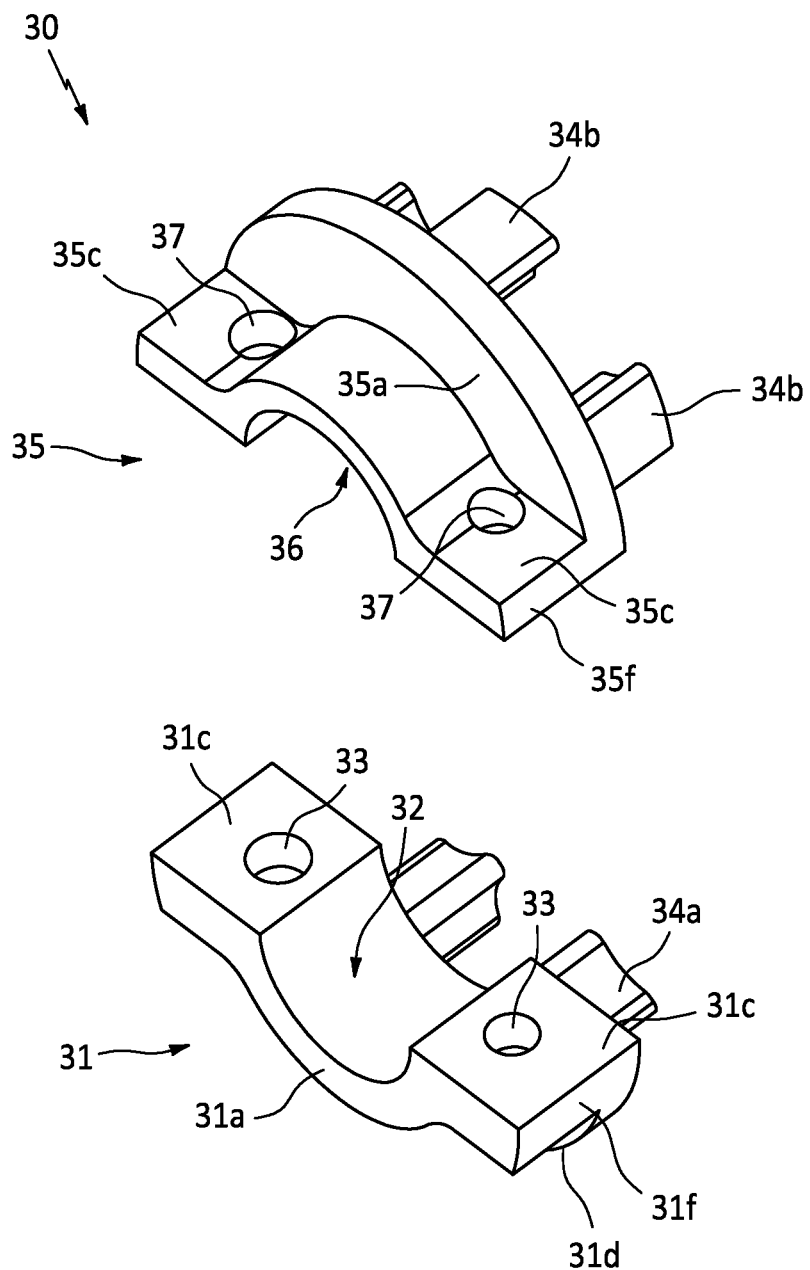
FIG. 3A is a front perspective view of the handlebar clamping assembly of the shock and vibration isolating handlebar mounting device, in accordance with one embodiment of the invention.
Figure 3B:
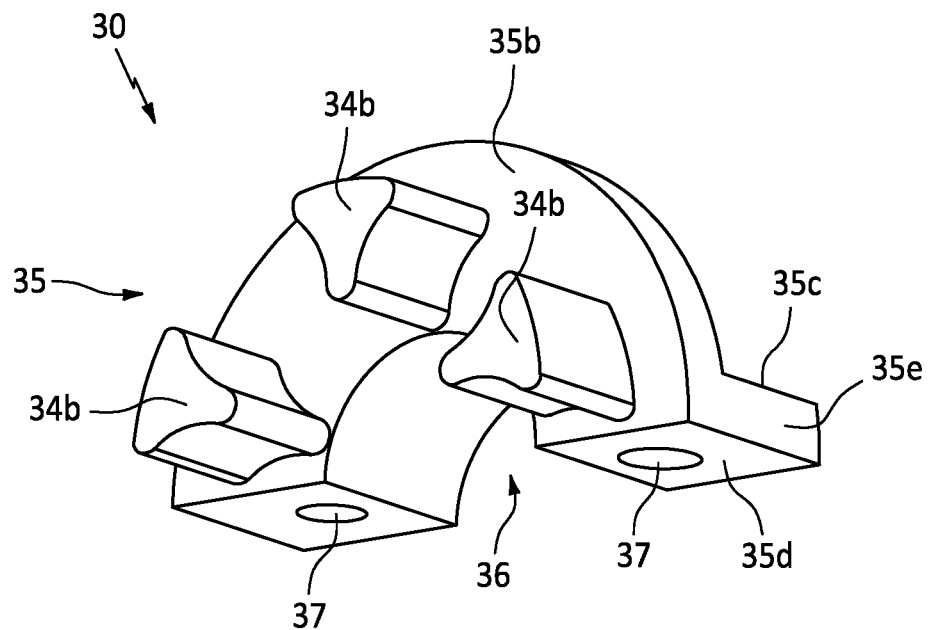
FIG. 3B is a back perspective view of the handlebar clamping assembly of the shock and vibration isolating handlebar mounting device, in accordance with one embodiment of the invention.
Figure 3B:
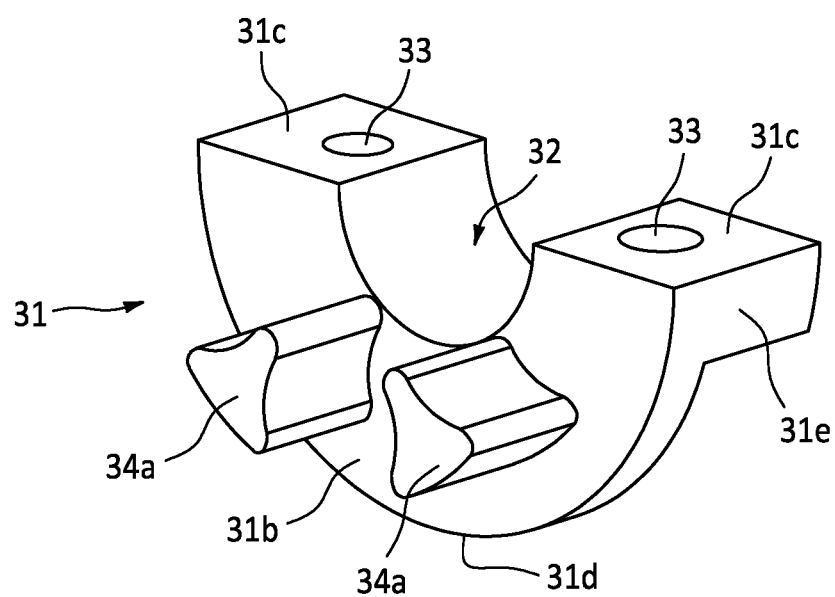

Referring now to FIGS. 3A-3B, the handlebar clamping assembly 30 can include a lower clamp component 31 and an upper clamp component 35 that are adapted and configured to be connected to a handlebar such that the handlebar can be selectively rotatable within the assembly to allow for selective orientation of the handlebar relative to the vehicle.

In one embodiment, the lower clamp component 31 can include a body section having a front surface 31a, a back surface 31b, a top surface 31c, a bottom surface 31d, and a pair of side surfaces 31e and 31f. The lower clamp component can be adapted and configured to mate with a portion of the handlebar 1 as will be discussed in more detail below. In the embodiments shown, the top surface 31c can define a semi-circular groove 32, and can include a pair of threaded apertures 33.

The upper clamp component 35 includes functionality for selectively engaging the handlebar 1 and the upper end 31c of the lower clamp component 31. In one embodiment, the upper clamp component 35 includes a body section having a front surface 35a, a back surface 35b, a top surface 35c, a bottom surface 35d, and a pair of side surfaces 35e and 35f. The bottom surface 35d defines a semi-circular groove 36 which is adapted and configured to mate with the handlebar 1. The upper surface 35c includes a pair of apertures 37 which extend through the upper clamp component. As shown at FIG. 2, a pair of threaded bolts 21 are provided which are adapted to extend through apertures 37 and engage with the threaded apertures 33 in the top surface 31c of the lower clamp component 31.

In one embodiment, a plurality of projections 34a and 34b can extend outward from the back surfaces 31b and 35b of the upper and lower clamp components, respectively. In the preferred embodiment, each of the projections can be generally triangular in shape; however, those of skill in the art will recognize that other shapes can be used. In either instance, the projections 34a and 34b can extend generally perpendicular from the bodies of the lower clamp component 31 and upper clamp component 35, respectively, but it is contemplated that in other embodiments, the projections may extend away from the bodies at angles other than right angles.

Figure 4:
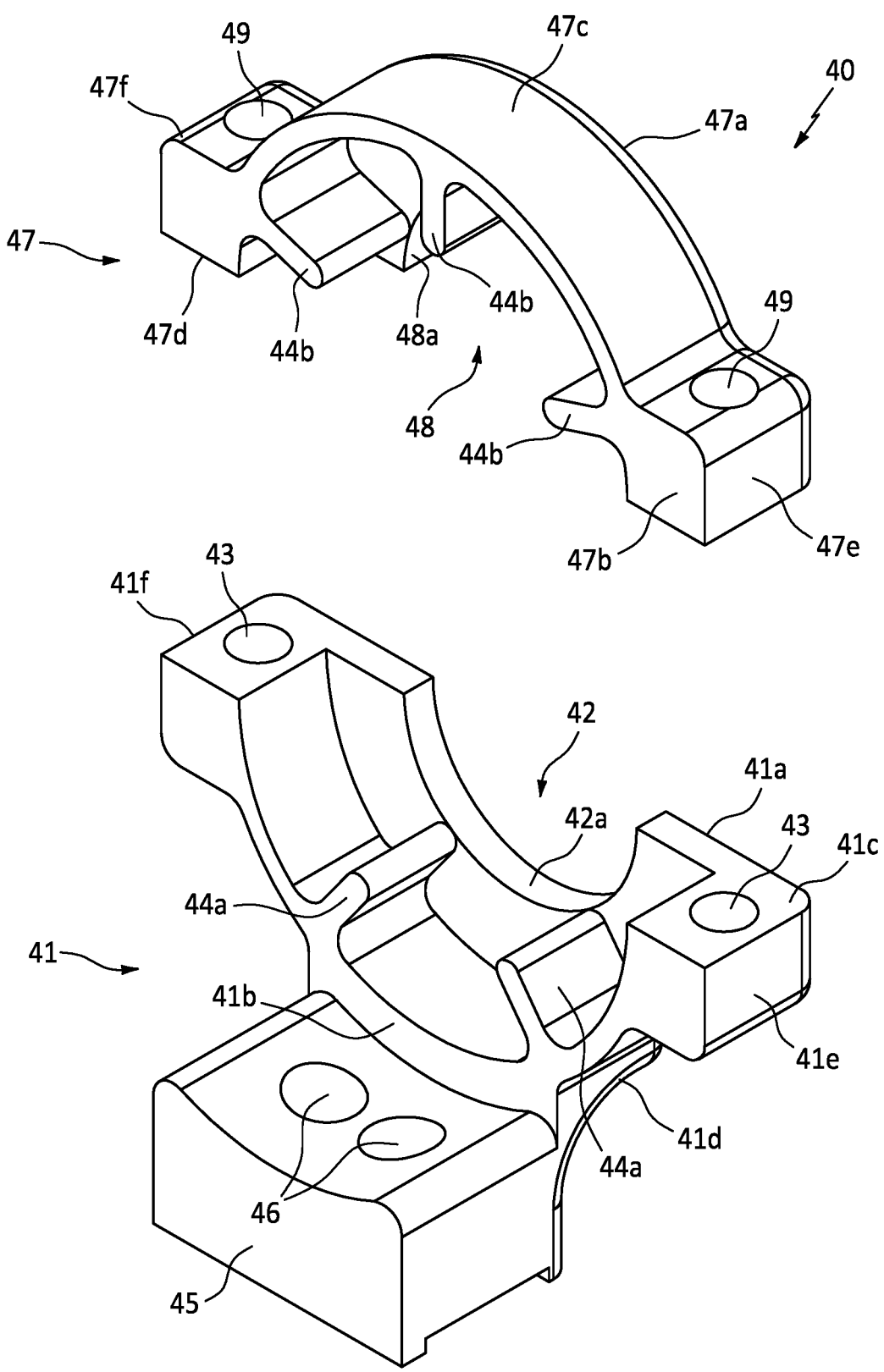
FIG. 4 is a perspective view of the steering structure clamping assembly of the shock and vibration isolating handlebar mounting device, in accordance with one embodiment of the invention.

As shown at FIG. 4, the steering structure clamping assembly 40 can include a riser 41 and a clamp structure 47 that are adapted and configured to be connected to the above-described handlebar clamping assembly 30 in order to secure the same onto the steering structure of the vehicle.

In one embodiment, the riser 41 can include a body section having a front surface 41a, a back surface 41b, a top surface 41c, a bottom surface 41d, and a pair of side surfaces 41e and 41f. As shown, the top surface 41 of the riser can define a semi-circular groove 42 and can include a pair of threaded apertures 43. In one embodiment, a plurality of protrusions 44a can be disposed within the semi-circular groove 42 and can extend from the inside portion of the front surface 41a toward the back surface 41b. Each of the protrusions can also extend from the bottom surface 41d to a lip 42a of the groove 42.

In one embodiment, a mounting block 45 can extend outward from the back surface 41b of the riser. In the preferred embodiment, the mounting block can include the illustrated rectangular shape and can include mounting apertures 46 extending through the mounting block for receiving mounting bolts 22 to mate with the steering structure 40 as will be discussed in more detail below.

The steering structure clamping assembly 40 also includes a clamping structure 47 to couple the riser 41 to the above-described handlebar clamping assembly 30. Such structure preferably includes any structure that allows the handlebar assembly 30 to be coupled to the riser 41 while allowing for selective rotation of the handlebar 1 and/or handlebar assembly 30 about a first axis to allow for adjustment of the axial orientation of the handlebar 1 relative to the vehicle. Those of skill in the art will be able to contemplate a variety of structures that can achieve this desired result.

In one embodiment, the clamping structure 47 includes a body section having a front surface 47a, a back surface 47b, a top surface 47c, a bottom surface 47d, and a pair of side surfaces 47e and 47f. The bottom surface 47d defines a semi-circular groove 48. A plurality of protrusions 44b can be disposed within the semi-circular groove 48 and can extend from the inside portion of the front surface 47a toward the back surface 47b. Each of the protrusions can also extend from the bottom surface 47d to a lip 48a of the groove 48.

The top surface 47c can include a pair of apertures 49 which extend through the upper clamping structure. As shown at FIG. 2, a pair of threaded bolts 23 are provided which are adapted to extend through the apertures 49 and engage with the threaded apertures 43 in the top surface 41c of the riser 41.

In the preferred embodiment, the handlebar clamping assembly 30, and steering structure clamping assembly 40 will preferably be constructed from steel. However, other embodiments are contemplated wherein these assemblies are formed from other materials that are, for example, extremely strong and stiff. Several nonlimiting examples include but are not limited to various metals or metal alloys (e.g., aluminum, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.).

Figure 5A:
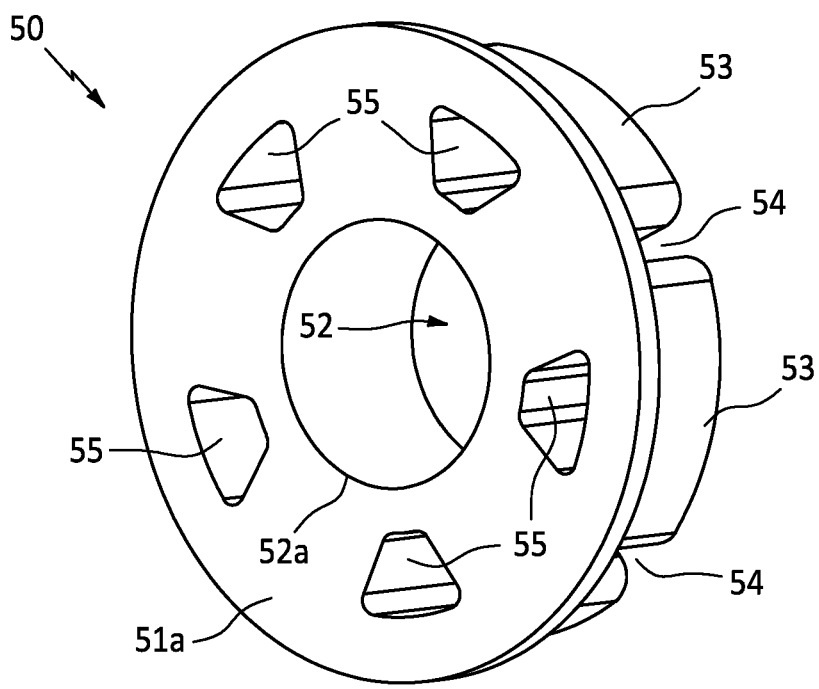
FIG. 5A is a front perspective view of the isolator of the shock and vibration isolating handlebar mounting device, in accordance with one embodiment of the invention.
Figure 5B:
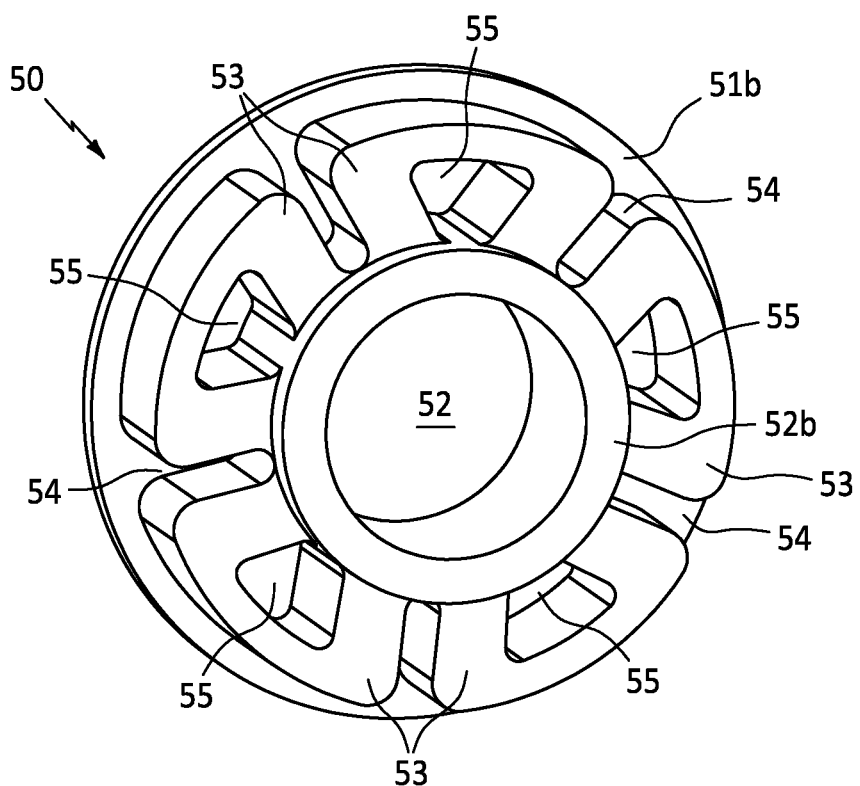
FIG. 5B is a back perspective view of the isolator of the shock and vibration isolating handlebar mounting device, in accordance with one embodiment of the invention.

FIGS. 5A and 5B illustrate one embodiment of an isolator 50 that is designed to be positioned between the handlebar clamping assembly 30, and the steering structure clamping assembly 40. As shown, the isolator can include a generally circular shaped body having a front surface 51a and a back surface 51b. In one embodiment, a hollow cylindrical channel 52 can be positioned along the circular body such that the open first end 52a of the channel is located along the front surface 51a, and the open second end 52b extend outward from the back surface 51b.

In one embodiment, a plurality of isolator protrusions 53 can extend outward from the back surface 51b. Each of the isolator protrusions 53 can be separated by gaps 54 and can be arranged so as to encircle the cylindrical channel 52. In one embodiment, a plurality of apertures 55 can extend from the front surface 51a through the isolator protrusions 53.

In one embodiment, each of the apertures 55 can include a shape, size and spacing that is complementary to the shape, size and spacing of the protrusions 34a and 34b of the handlebar assembly 30, so as to allow the protrusions 34a and 34b to be positioned within the apertures 55.

Likewise, each of the gaps 54 separating the isolator protrusions 53 can include a shape, size and spacing that is complementary to the shape, size and spacing of the protrusions 44a and 44b of the steering assembly 40 so as to allow the protrusions 44a and 44b to be positioned within the gaps 54 and between the isolator protrusions 53.

In the preferred embodiment, the isolator component will be constructed from rubber; however, any number of other natural or synthetic materials having vibration dampening qualities are also contemplated. Several nonlimiting examples include but are not limited to various types of synthetic rubber, neoprene, polyurethane and/or polyvinyl chloride products, for example.

Although illustrated with regard to a unitary construction, other embodiments are contemplated wherein the isolator is constructed from two halves that form the illustrated shape when joined together. Such a feature being useful for easing the installation of the isolator onto a handlebar when installing the device 10 and/or system 100.

Figure 6:
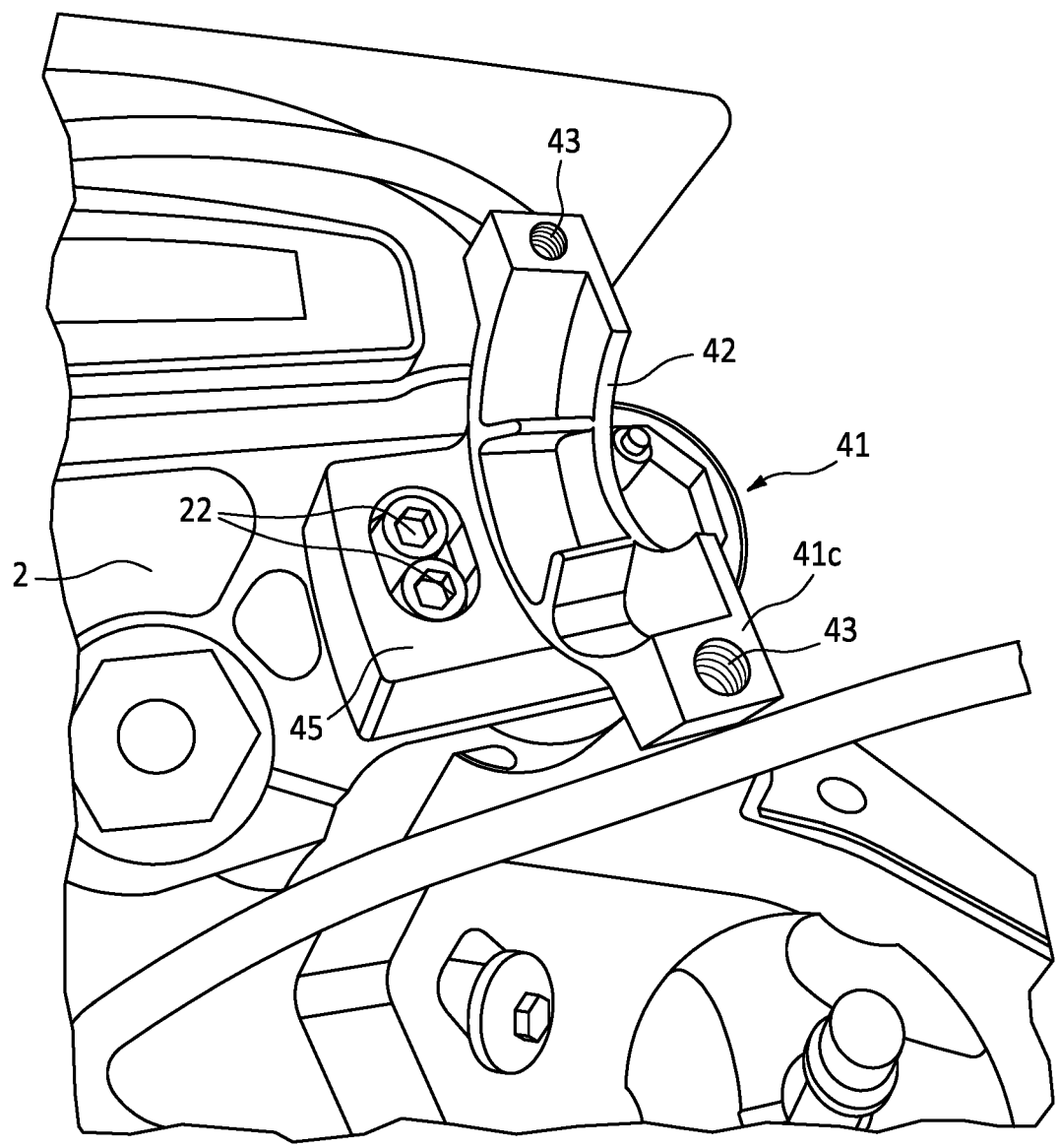
FIG. 6 is a perspective view of the shock and vibration isolating handlebar mounting device in operation, in accordance with one embodiment of the invention.
Figure 7:
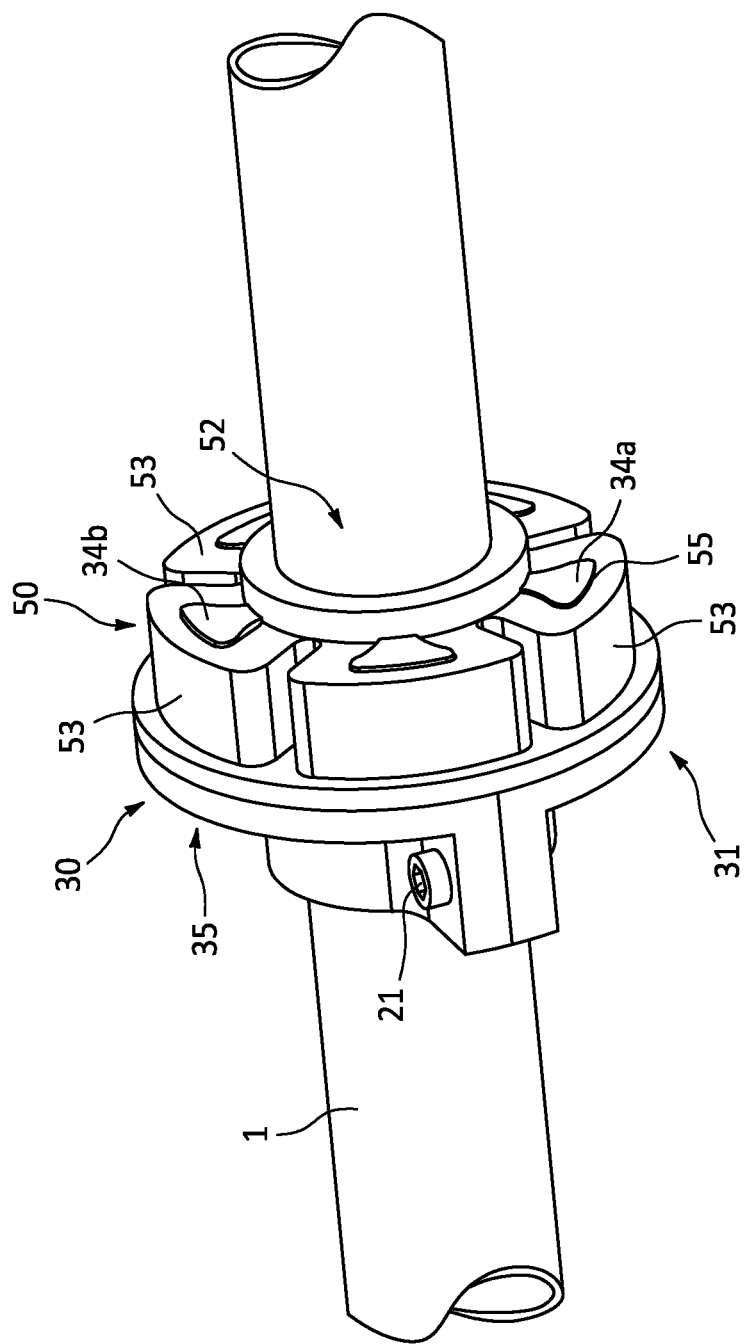
FIG. 7 is a perspective view of the shock and vibration isolating handlebar mounting device in operation, in accordance with one embodiment of the invention.

As shown at FIGS. 6 and 7, the riser 41 can be mounted onto the steering structure 2 of the vehicle using the bolts 22, wherein the bolts are passed through the apertures 46 of the mounting block 45 and secured into complementary located threaded apertures on the steering structure 2. In the illustrated embodiments, the steering structure is represented as the triple tree clamp for a motorcycle front fork crown; however, this is for illustrative purposes only, as the inventive concepts may be utilized with any number of different steering structures on any number of different vehicles.

Next, the handlebar 1 can be coupled to the assembly 30 by placing the handlebar 1 in the semi-circular groove 32 of the lower clamp component 31 and the semi-circular groove 36 of the upper clamp component 35. Threaded bolts 21 can then be inserted through apertures 37 and tightened into threaded apertures 33 to couple the handlebar 1 to the assembly 30.

Next, the isolator 50 can be positioned onto the handlebar 1 such that the handlebar is located through the cylindrical channel 52. When so positioned, the isolator can be slid toward the assembly 30 until the protrusions 34a and 34b are located through the openings 55 on the isolator 50. When so positioned, the distal ends of the protrusions 34a and 34b will be even with the open ends of the protrusions 53 on the isolator. These components 34a, 34b and 53 will then be secured into the semi-circular openings of the riser as described below.

Next, the assembly 30 can be positioned into the semi-circular groove 42 of the riser 41 and the clamp structure 47 can be aligned with the same and lowered until the assembly 30 is located within the semi-circular groove 48 of the clamp structure 47. At this time, the protrusions 44a and 44b will be located within the gaps 54 of the isolator, thus ensuring no metallic portions of the handlebar 1 or assembly 30 are in contact with any metallic portions of the assembly 40 or the vehicle. Finally, threaded bolts 23 can then be inserted through apertures 49 and tightened into threaded apertures 43 to secure the assembly 30 onto the riser as shown at FIG. 1.

Returning to FIG. 1, in the preferred embodiment two complete mounting devices 10 can be used to mount a handlebar 1 onto the steering structure 3. In this regard, the devices 10 are preferably spaced in relation to one another when connected to the steering structure 3 and handlebar 1.

In this embodiment, the fact that there are two devices 10 allows for adaptation of the system to a broad variety of vehicles. For example, many vehicles may have different vehicle steering structures that may or may not be the same size across a broad range of vehicles. The use of multiple devices 10 each comprising individually adjustable mounting assemblies 30, 40 and 50 allows for the device and system to fit many different shapes and sized components so as to be universal in nature, and thus able to be used with a wide variety of vehicles and applications.

As described herein, one or more elements of system 100 and device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A vehicle handlebar mounting device, said device comprising:
   a handlebar clamping assembly that is configured to engage a handlebar of a vehicle;
   a steering structure clamping assembly that is configured to engage a steering structure of the vehicle, said steering structure clamping assembly including a riser having a mounting block and a first semi-circular groove along a top surface, and a clamp structure having a second semi-circular groove along a bottom surface; and
   an isolator that is configured to be positioned between the handlebar clamping assembly and the steering structure clamping assembly,
   wherein the isolator is constructed from a non-metallic vibration isolating material,
   wherein the riser and the clamp structure are removably secured together,
   wherein the first semi-circular groove and the second semi-circular groove form a single circular opening having a shape and a size that is complementary to a shape and a size of the isolator, and in an assembled configuration, the isolator prevents the steering structure clamping assembly from making physical contact with the handlebar clamping assembly.

2. The device of claim 1, wherein the handlebar clamping assembly comprises:
   a lower clamp component having a first semi-circular groove along a top surface; and
   an upper clamp component having a second semi-circular groove along a bottom surface.

3. The device of claim 2, wherein the lower clamp and the upper clamp are removably secured together, and
   wherein the first semi-circular groove and the second semi-circular groove form a single circular opening.

4. The device of claim 3, wherein the handlebar is a motorcycle handlebar, and the single circular opening includes a shape and a size that is suitable for receiving the motorcycle handlebar.

5. The device of claim 3, further comprising:
   a pair of spaced apart apertures located along the upper clamp component; and
   a pair of threaded apertures located along the top surface of the lower clamp component.

6. The device of claim 5, wherein the
   lower clamp and the upper clamp are removably secured together by a pair of bolts that are positioned through the pair of spaced apart apertures and engaged to the pair of threaded apertures.

7. The device of claim 1, wherein the riser includes a pair of mounting apertures that are configured to receive a pair of mounting bolts for securing the riser onto the steering structure of the vehicle.

8. The device of claim 1, further comprising:
   a pair of spaced apart apertures located along the clamp structure; and
   a pair of threaded apertures located along the top surface of the riser.

9. The device of claim 1, wherein the riser and the clamp structure are removably secured together by a pair of bolts that are positioned through the pair of spaced apart apertures and engaged to the pair of threaded apertures.

* * * * *